United States Patent [19]

Kurita et al.

[11] Patent Number: 4,940,419
[45] Date of Patent: Jul. 10, 1990

[54] ELECTRICAL JUNCTION BOX

[75] Inventors: Kaoru Kurita; Yukio Nishio, both of Shizuoka, Japan

[73] Assignee: Yazaki Corporation, Tokyo, Japan

[21] Appl. No.: 328,390

[22] Filed: Mar. 24, 1989

[30] Foreign Application Priority Data

Mar. 25, 1988 [JP] Japan .............................. 63-38427[U]

[51] Int. Cl.⁵ .............................................. H01R 4/00
[52] U.S. Cl. .................................................. 439/271
[58] Field of Search ................................. 439/271–277

[56] References Cited

U.S. PATENT DOCUMENTS

| 3,904,812 | 9/1975 | Daffron | 439/271 |
| 4,395,085 | 7/1983 | Inoue | 439/271 |
| 4,545,632 | 10/1985 | Maier et al. | 439/271 |
| 4,637,674 | 1/1987 | Kobler | 439/271 |
| 4,640,567 | 2/1987 | Lundergam et al. | 439/271 |

Primary Examiner—Joseph H. McGlynn
Attorney, Agent, or Firm—Armstrong, Nikaido, Marmelstein, Kubovcik & Murray

[57] ABSTRACT

An electrical junction box comprising a connector receiving portion formed on an upper surface of the electrical junction box for receiving a connector connected at an end of a wire harness. Thus, the connecting work of the connector to the electrical junction box can be easily carried out without requiring the operator is to grasp the electrical junction box. Accordingly, complete connection of the connector may be ensured.

3 Claims, 3 Drawing Sheets

ELECTRICAL JUNCTION BOX

BACKGROUND OF THE INVENTION

The present invention relates to an electrical junction box for use with electrical wiring for an automobile, and more particularly to an electrical junction box which may improve the workability in connecting a wire harness thereto.

FIGS. 5 and 6 show a conventional waterproof electrical junction box A to be installed in an engine room into which rainwater or the like tends to enter. Referring to FIGS. 5 and 6, reference numeral 1 designates a body of the electrical junction box A. The body 1 encases a wiring board 5 comprising a plurality of bus bars 3 formed with upper and lower tab terminals 2 and an insulating board 4. A mounting bracket 5 is provided on an outer surface of the body 1, so as to mount the electrical junction box A to a vehicle body or the like.

A main cover 7 is also encased in the body 1 in such a manner as to cover an upper surface of the wiring board 5. The main cover 7 is formed with receiving portions 10 for receiving a relay 8 and the fuses 9. A relay terminal 12 and the like of the relay 8 and the fuse 9 are connected through interconnecting terminals 11 to the upper tab terminals 2 of the wiring board 5.

Reference numeral 13 designates a waterproof cover mounted on an upper end of the body 1. The body 1 is formed at its lower portion with connector receiving portions 14 and 15 for receiving connectors 14' and 15' connected with ends of wire harnesses $W_1$ and $W_2$, respectively. The lower tab terminals 2 of the wiring board 5 project into the connector receiving portions 14 and 15. Reference numeral 16 designates an under cover (connector cover) disengageably mounted to a lower end of the body 1.

Normally, such electrical junction box A is delivered to a car maker under the condition that one of the wire harnesses $W_1$ and $W_2$ is connected to the electrical junction box A. In the case that the electrical junction box A is delivered to the car maker under the condition that the wire harness $W_1$ is connected thereto, the other wire harness $W_2$ is connected to the electrical junction box A by the car maker. In connecting the wire harness $W_2$ to the electrical junction box A, an operator of the car maker is usually obliged to take the electrical junction box A with one hand and connect the connector 15' of the wire harness $W_2$ to the electrical junction box A with the other hand because an engine room space and a length of the wire harness are limited.

However, on-vehicle electrical parts have been recently increased in number to cause an increase in volume and weight of the electrical junction box. Accordingly, the grasping of the electrical junction box with one hand is a heavy burden for the operator, causing a difficulty in the connecting work of the connector 15'. As a result, there is a possibility that the connector 15' will not be completely connected to the electrical junction box. Thus, the reliability of the electrical connection cannot be ensured.

SUMMARY OF THE INVENTION

Accordingly, it is an object of the present invention to provide an electrical junction box which may make easy the connecting work of the wire harness in the car maker.

It is another object of the present invention to provide a waterproof electrical junction box which may ensure complete connection with a connector connected to a wire harness and improve the productivity.

According to one aspect of the present invention, there is provided an electrical junction box comprising a connector receiving portion formed on an upper surface of said electrical junction box for receiving a connector connected at an end of a wire harness.

According to another aspect of the present invention, there is provided an electrical junction box and connector assembly comprising an electrical junction box formed on its upper surface with a connector receiving portion and a waterproof connector adapted to be received in said connector receiving portion of said electrical junction box, said waterproof connector being connected at one end of a wire harness.

Other objects and features of the invention will be more fully understood from the following detailed description and appended claims when taken with the accompanying drawings.

DETAILED DESCRIPTION OF THE PREFERRED EMBODIMENT

Figure 5:
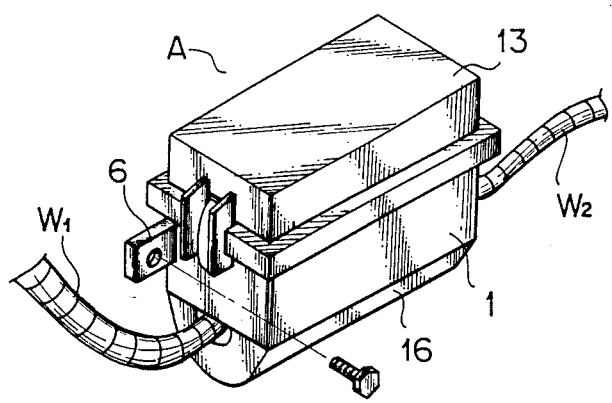
FIG. 5 is a perspective view of the electrical junction box in the prior art.
Figure 6:
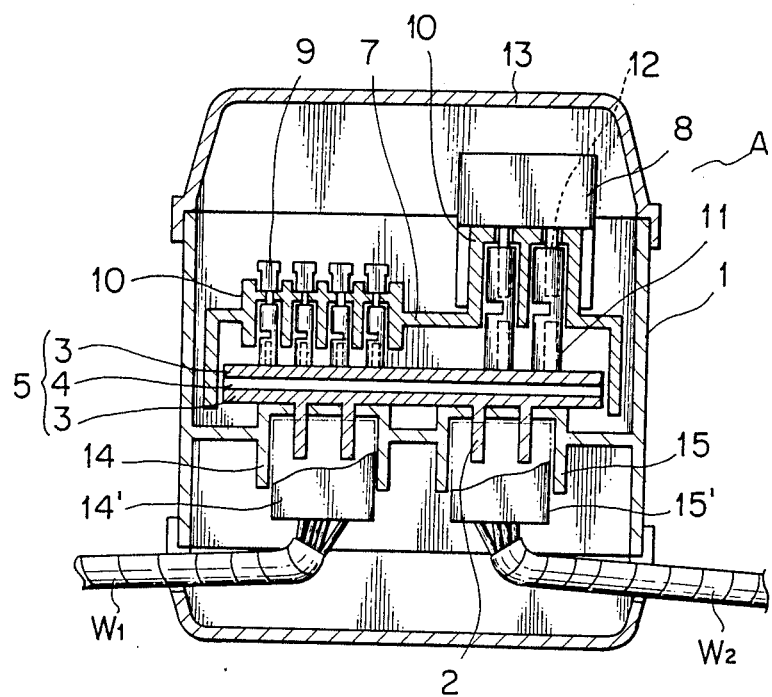
FIG. 6 is a vertical sectional view of FIG. 5.

There will now be described a preferred embodiment of the present invention with reference to FIGS. 1 to 4. In the drawings, the same or corresponding parts are designated by the same reference numerals as in FIGS. 5 and 6, and the explanation thereof will be partially omitted hereinafter.

Figure 1:
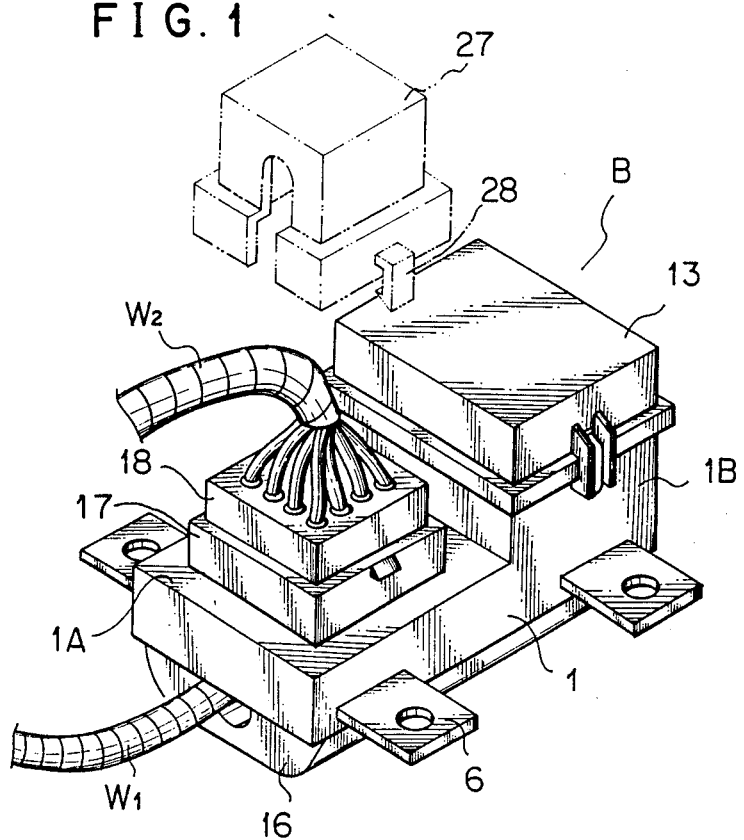
FIG. 1 is a perspective view of a preferred embodiment of the electrical junction box according to the present invention.
Figure 4:
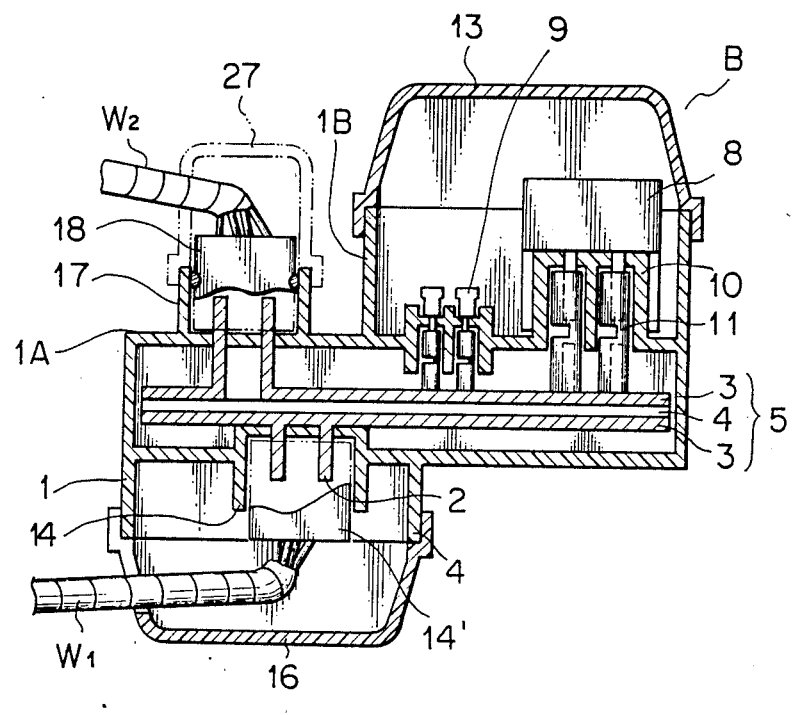
FIG. 4 is a vertical sectional view of FIG. 1.

Referring to FIGS. 1 and 4, an electrical junction box B is formed on its upper surface with a connector receiving portion 17 for receiving an end connector 18 connected at an end of a wire harness $W_2$. A body 1 of the electrical junction box B is comprised of a lower portion 1A for encasing a wiring board 5 and an upper portion 1B for encasing a relay 8 and a fuse 9. The lower portion 1A is formed at its upper surface with the connector receiving portion 17 as mentioned above. A waterproof of cover 13 is mounted on an upper end of the upper portion 1B, and another waterproof cover 27 is preferably mounted on an upper end of the connector receiving portion 17. The waterproof cover 27 is locked by locking members 28.

Figure 2:
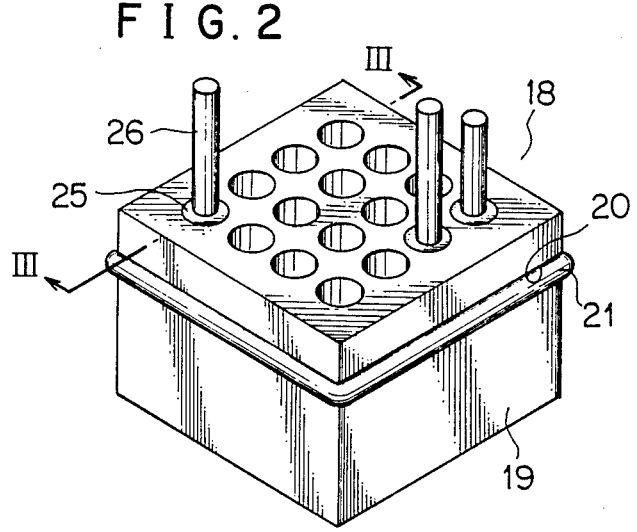
FIG. 2 is an enlarged perspective view of an end connector shown in FIG. 1.
Figure 3:
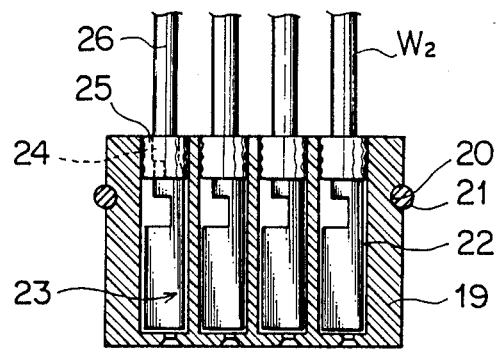
FIG. 3 is a cross section taken along the line III—III in FIG. 2.

As shown in FIGS. 2 and 3, the terminal connector 18 to be received in the connector receiving portion 17 has a waterproof structure. That is, the terminal connector 18 is comprised of an insulating housing 19, an outer peripheral groove 20 formed on an outer periphery of the insulating housing 19, a seal packing 21 received in the outer peripheral groove 20, terminal receiving chambers 22 defined in the insulating housing 19, female terminals 23 received in the terminal receiving chambers 22, wire connecting portions 24 for connecting wires 26 of the wire harness $W_2$ with the female terminals 23, and waterproof rubber plugs 25 for sealing the wire connecting portions 24.

In operation, the electrical junction box B is fixed through mounting brackets 6 to a vehicle body or the like. Then, the terminal connector 18 of the wire harness $W_2$ is engaged with the connector receiving portion 17 of the electrical junction box B. Then, the wire harness $W_2$ is mounted to the vehicle body. The mounting of the wire harness $W_2$ may be carried out prior to the connecting work of the terminal connector 18 to the electrical junction box B.

Thus, the connecting work of the terminal connector 18 to the electrical junction box B can be easily carried out without the necessity such that the operator is obliged to grasp the electrical junction box B. Accordingly, complete connection of the connector may be ensured.

While the invention has been described with reference to a specific embodiment, the description is illustrative and is not to be construed as limiting the scope of the invention. Various modifications and changes may occur to those skilled in the art without departing from the scope of the invention as defined by the appended claims.

What is claimed is:

1. A waterproof electrical junction box having upper and lower surfaces that comprises:
    a first connector receiving portion provided on the upper surface and adapted for receiving a waterproof connector;
    a second connector receiving portion provided on the lower surface and adapted for receiving a lower connector, wherein said second connector receiving portion includes a connector cover engageably mounted to said second connector receiving portion for covering said second connector receiving portion and said lower connector when said second connector receiving portion and said lower connector are engaged; and
    a waterproof connector operatively connected to a wire harness and adapted for being connected into said first connector receiving portion wherein said waterproof connector includes
    an insulating housing having terminal receiving chambers defined therein, said insulating housing also having an outer peripheral groove formed on an outer periphery thereof,
    a seal packing placed in said outer peripheral groove for providing a waterproof seal between said insulating housing and said first connector receiving portion when connected, and
    waterproof rubber plugs connected to wires with terminals from said wire harness for connecting and waterproof sealing the wires and terminals into the said terminal receiving chambers of said insulating housing.

2. An electrical junction box according to claim 1, wherein said waterproof connector is inserted into said connector receiving portion after said wire harness is installed in place.

3. A waterproof electrical junction box as set forth in claim 1, further comprising:
    a waterproof cover engageably connected to said first connector receiving portion for covering said waterproof connector when engaged with said first connector receiving portion.

* * * * *